(12) United States Patent
Shaffer

(10) Patent No.: US 6,244,494 B1
(45) Date of Patent: Jun. 12, 2001

(54) APPARATUS AND METHOD FOR LEVELING THE CLAMPING SURFACE TO PROVIDE PROPER HEAT SINK FOR NARROW STRIPS IN COIL END JOINER

(75) Inventor: Steve Shaffer, Hudson, OH (US)

(73) Assignee: Iron Bay, Inc., Hudson, OH (US)

( * ) Notice: Subject to any disclaimer, the term of this patent is extended or adjusted under 35 U.S.C. 154(b) by 0 days.

(21) Appl. No.: 09/329,868

(22) Filed: Jun. 11, 1999

(51) Int. Cl.[7] ............................. B23K 37/00; B23K 37/04
(52) U.S. Cl. ..................... 228/5.7; 228/44.3; 228/49.1; 228/49.4; 228/147; 228/213
(58) Field of Search ..................... 228/147, 212, 228/213, 4.1, 5.7, 6.1, 44.3, 49.1, 49.4; 269/41, 43

(56) References Cited

U.S. PATENT DOCUMENTS

| | | |
|---|---|---|
| 1,524,056 | 1/1925 | Pritchard . |
| 3,131,663 | 5/1964 | Lawson . |
| 3,190,525 | 6/1965 | Foley et al. . |
| 3,247,354 | 4/1966 | Mallett et al. . |
| 3,256,419 | 6/1966 | Taylor et al. . |
| 3,286,342 | 11/1966 | Seeloff et al. . |
| 3,355,077 | 11/1967 | Woodward . |
| 3,378,185 | 4/1968 | Wheeler et al. . |
| 3,386,640 | 6/1968 | Booher . |
| 3,403,833 | 10/1968 | Wheeler et al. . |
| 3,610,546 | 10/1971 | McGorry . |
| 3,618,844 | 11/1971 | Morley et al. . |
| 3,632,035 | 1/1972 | Wheeler . |
| 3,916,140 | 10/1975 | Clews . |
| 3,941,972 | 3/1976 | Toma . |
| 3,949,790 | 4/1976 | Rass et al. . |
| 4,067,489 | 1/1978 | Ishioka et al. . |
| 4,129,244 | 12/1978 | Morris . |
| 4,286,744 | 9/1981 | Gullotti et al. . |
| 4,304,977 | 12/1981 | Hanai et al. . |
| 4,367,839 | 1/1983 | Angerer . |
| 4,489,229 | 12/1984 | Haessly . |
| 4,586,644 | 5/1986 | Raush et al. . |
| 4,626,655 | 12/1986 | Angerer . |
| 4,765,532 | 8/1988 | Uomoti et al. . |
| 4,840,303 | 6/1989 | Fujii et al. . |
| 4,850,522 | 7/1989 | Nichols . |
| 4,854,493 | 8/1989 | Fujii et al. . |
| 4,973,089 | 11/1990 | Wheeler et al. . |
| 5,030,313 | 7/1991 | Takeda et al. . |
| 5,161,797 | * 11/1992 | Frasca ................................. 273/3 R |
| 5,169,051 | 12/1992 | Noé . |
| 5,172,846 | 12/1992 | Hayashi et al. . |
| 5,190,204 | 3/1993 | Jäck et al. . |
| 5,605,275 | 2/1997 | Rintala . |
| 5,896,644 | * 4/1999 | Lucenta et al. ..................... 29/566.1 |
| 5,992,726 | * 11/1999 | Shaffer ................................. 228/5.7 |

* cited by examiner

Primary Examiner—Patrick Ryan
Assistant Examiner—Colleen P. Cooke
(74) Attorney, Agent, or Firm—Oldham & Oldham Co., L.P.A.

(57) ABSTRACT

An apparatus and method for leveling the clamping surface to obtain proper heat sink for narrow strips in a coil end joiner which includes a coil material support table and a retaining plate which is positioned against the upper surface of the coil material to be joined by, for example, one or more air cylinders. A weld clamp leveler is also provided which is adjustable to provide a preselected offset between the coil material support table and the retaining plate in a forward portion of the coil material support table. The weld clamp leveler is preferably used when relatively narrow coil material is being joined to preclude tilting of the retaining plate relative to the coil material support table and the coil material being joined and is preferably adjusted to provide approximately the same offset between the coil end support table and the retaining plate as the thickness of the coil material being joined. On the other hand, when coil material which is sufficiently wide to preclude tilting of the retaining plate is being joined, the weld clamp leveler is disengaged and does not interfere with the coil end arc welding operation.

17 Claims, 3 Drawing Sheets

APPARATUS AND METHOD FOR LEVELING THE CLAMPING SURFACE TO PROVIDE PROPER HEAT SINK FOR NARROW STRIPS IN COIL END JOINER

BACKGROUND AND SUMMARY OF THE INVENTION

The present invention relates generally to new and novel improvements in an apparatus and method for leveling the clamping surface to obtain proper heat sink for narrow strips in a coil end joiner. More particularly, the present invention relates to an apparatus and method for leveling the clamping surface to obtain proper heat sink for narrow strips in a coil end joiner which facilitates the positioning of the coil ends in a coil end joiner to provide substantially edge-to-edge weld penetration in a coil end to coil end weld joint.

In many metalworking operations involving stamping, forming or otherwise processing a metallic material provided in a coil configuration, it is desirable to join the trailing end of a coil about to be depleted with the leading end of a new coil to facilitate the metalworking operations. For example, if coil material is being fed through a press or some other piece of metalworking equipment, it is often desirable to have an "endless" supply of material to reduce or eliminate the necessity of "rethreading" the coil material when a coil is depleted. In the past, various types of coil end joiners have been used to join the trailing end of a coil about to be depleted with the leading end of a new coil to provide such an "endless" supply of material.

Many prior art coil end joiners butt up the trailing edge of a coil about to be depleted with the leading edge of a new coil and join the two (2) coil ends together, typically using an arc welding process, such as gas tungsten arc welding (GTAW), or perhaps more commonly known as tungsten inert gas (TIG) welding. Prior to the arc welding process, the trailing edge of the coil about to be depleted is butted up with the leading edge of the new coil and both the trailing edge of the coil about to be depleted and the leading edge of the new coil are typically positioned against a stop in the rear portion of the coil end joiner table. The trailing edge of the coil about to be depleted and the leading edge of the new coil are then typically held in position for the arc welding process by a retaining plate which is moved downwardly against the trailing edge of the coil about to be depleted and the leading edge of the new coil by one or more air cylinders. When the coil material being joined is sufficiently wide, the retaining plate which is moved downwardly against the trailing edge of the coil about to be depleted and the leading edge of the new coil engages a sufficient portion of the coil material such that the retaining plate is substantially level and an acceptable coil end arc weld joint is achieved. However, if the coil material being joined is relatively narrow, the retaining plate which is moved downwardly against the trailing edge of the coil about to be depleted and the leading edge of the new coil may tilt and engage the front edge of the coil material and a forward portion of the coil end joiner support table, thus resulting in the retaining plate being tilted in relation to the coil end joiner support table and the coil material being joined. This may result in the retaining plate being positioned above all of the coil material being joined, with the exception of the front edge of the coil material being joined where there is contact between the retaining plate and the coil material being joined. Such tilting of the retaining plate often results in "burnout/suck back" occurring at or near the start of the coil end arc weld joint, insufficient cooling of the coil end arc weld and, in general, an unsatisfactory coil end arc weld joint.

For example, in FIG. 1, a coil end arc weld is shown where the retaining plate was tilted, resulting in a substantially circular "keyhole burnout/suck back" portion being present near the start of the coil end arc weld joint. A second example is shown in FIG. 2, where a coil end arc weld was made with the retaining plate tilted, resulting in a substantially semi-circular "burnout/suck back" portion being present extending to the initial edge of the coil material at the start of the coil end arc weld joint. On the other hand, FIG. 3 shows a coil end arc weld joint which was made with the retaining plate held substantially level and substantially edge-to-edge coil end arc weld joint penetration is achieved.

While the coil end arc weld joints shown in FIGS. 1 and 2 could perhaps be tolerated in some metalworking operations, other metalworking operations either require, or would benefit, from a substantially edge-to-edge coil end arc weld joint. For example, a trend in many metalworking operations is to strive to utilize a greater percentage of the raw material in end products and reduce the remaining "skeleton" web of scrap metal as much as possible. Thus, many stamping operations, such as the stamping of motor laminations, utilize either the entire width or substantially the entire width of the coil material to fabricate the end product. If such a product is stamped across a coil end arc weld joint having a substantially circular "keyhole burnout/suck back" portion, as shown in FIG. 1, or a substantially semi-circular "burnout/suck back" portion, as shown in FIG. 2, the end product would be defective and, perhaps in most cases, would have to be scrapped. Further, in other metalworking forming operations, such as forming a coil material into an end product having a tubular configuration, all of the coil material is utilized in the end product. Thus, an end product having a substantially circular "keyhole burnout/suck back" portion, as shown in FIG. 1, or a substantially semi-circular "burnout/suck back" portion, as shown in FIG. 2, would be defective and, in most cases, would have to be scrapped. Furthermore, in some metalworking operations, it is necessary or desirable to maintain a continuous "skeleton" web to, for example, provide for continuous "pull-through" of the "skeleton" web.

In addition to the substantially circular "keyhole burnout/suck back" portion, as shown in FIG. 1, or a substantially semi-circular "burnout/suck back" portion, as shown in FIG. 2, which sometimes occurs at the start of a coil end arc weld joint made with the retaining plate tilted, a significant build-up of metallic material can occur at the start of the coil end arc weld joint. Such a build-up of metallic material can have a negative effect on subsequent feeding, machining, tooling and/or other manufacturing operations and, if nothing else, is unsightly in a final end product and may necessitate further end product rework and/or repair operations.

In the past, in order to maintain the retaining plate substantially level when relatively narrow coil material is being joined, a piece of the parent coil material being joined has sometimes been manually positioned on a forward portion of the coil joiner support table so the retaining plate contacts the trailing edge of the coil material about to be depleted, the leading edge of the new coil material and the manually placed coil material to provide for a substantially level retaining plate. Such manual placement of coil material on the coil joiner support table is, at best, time consuming, and may expose the operator to possible injury since the coil material has to be manually placed between the coil joiner support table and the retaining plate prior to the coil end arc welding process and the coil material has to be manually removed after the coil end arc weld joint has been completed.

Accordingly, an object of the present invention is to provide an apparatus and method for leveling the clamping surface to obtain proper heat sink for narrow strips in a coil end joiner which facilitates maintaining a retaining plate substantially level during a coil end arc welding process, particularly when joining coil material which is relatively narrow.

Another object of the present invention is the provision of an apparatus and method for leveling the clamping surface to obtain proper heat sink for narrow strips in a coil end joiner which is economical to fabricate and maintain and which is easy to use.

These and other objects of the present invention are attained by an apparatus and method for leveling the clamping surface to obtain proper heat sink for narrow strips in a coil end joiner which includes a coil material support table and a retaining plate which is positioned against the upper surface of the coil material to be joined by, for example, one or more air cylinders. A weld clamp leveler is also provided which is adjustable to provide a preselected offset between the coil material support table and the retaining plate in a forward portion of the coil material support table. The weld clamp leveler is preferably used when relatively narrow coil material is being joined to preclude tilting of the retaining plate relative to the coil material support table and the coil material being joined and is preferably adjusted to provide approximately the same offset between the coil end support table and the retaining plate as the thickness of the coil material being joined. On the other hand, when coil material which is sufficiently wide to preclude tilting of the retaining plate is being joined, the weld clamp leveler is disengaged and does not interfere with the coil end arc welding operation.

Other advantages and novel features of the present invention will become apparent in the following detailed description of the invention when considered in conjunction with the accompanying drawings.

DETAILED DESCRIPTION OF THE DRAWINGS

Figure 1:
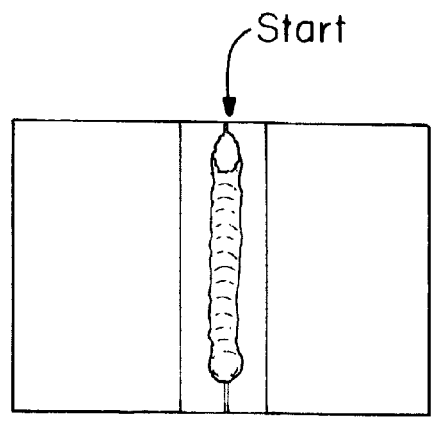
FIG. 1 is a top view of a coil end arc weld joint made using a gas tungsten arc welding (GTAW) or tungsten inert gas (TIG) welding process on a relatively narrow strip of coil material when the retaining plate is tilted in relation to the coil material support table and the coil material being joined, the coil end arc weld joint having a substantially circular "keyhole burnout/suck back" portion near the start of the coil end arc weld joint.
Figure 2:
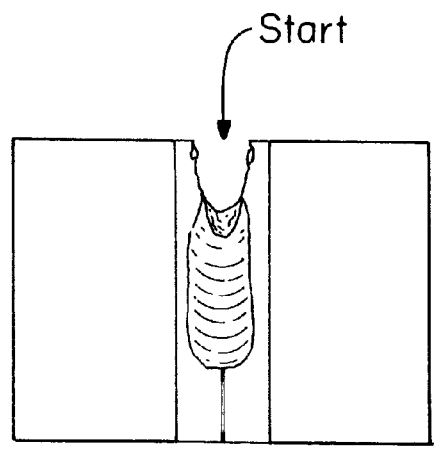
FIG. 2 is a top view of a coil end arc weld joint made using a gas tungsten arc welding (GTAW) or tungsten inert gas (TIG) welding process on a relatively narrow strip of coil material when the retaining plate is tilted in relation to the coil material support table and the coil material being joined, the coil end arc weld joint having a substantially semi-circular "burnout/suck back" portion at the start of the coil end arc weld joint.
Figure 3:
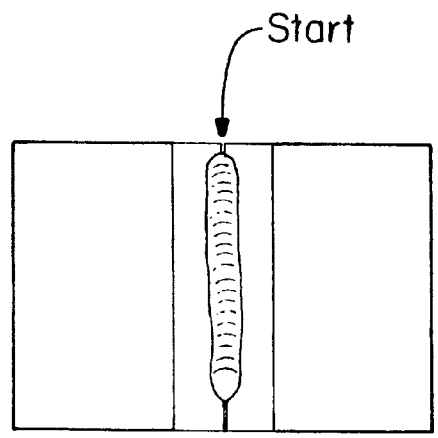
FIG. 3 is a top view of a coil end arc weld joint made using a gas tungsten arc welding (GTAW) or tungsten inert gas (TIG) welding process on a relatively narrow strip of coil material when the retaining table is relatively level in relation to the coil material support table and the coil material being joined, the coil end arc weld joint having substantially edge-to-edge penetration in the coil end arc weld joint.
Figure 4:
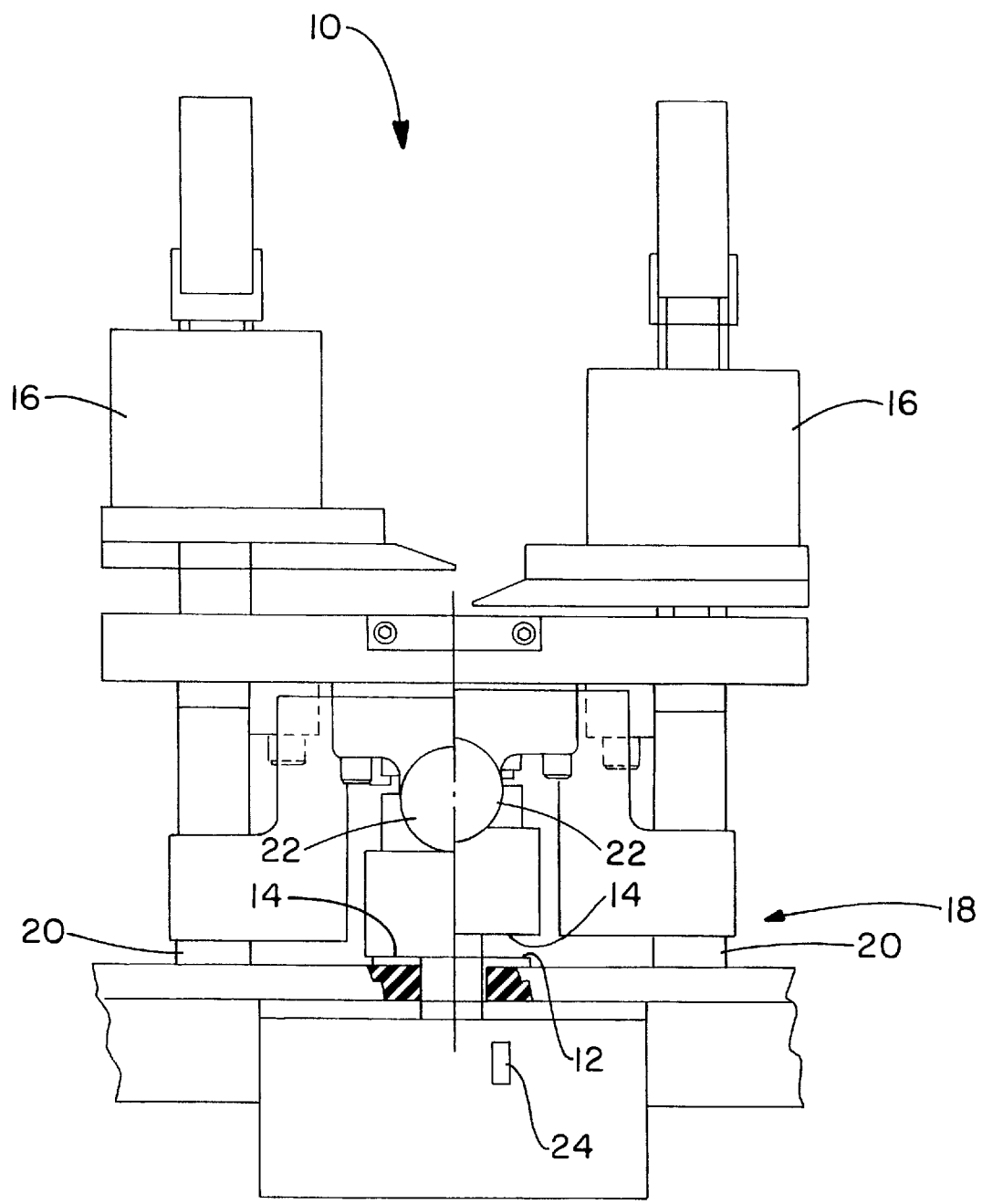
FIG. 4 is a front elevational view of an apparatus for leveling the clamping surface to obtain proper heat sink for narrow strips in a coil end joiner in accordance with a preferred embodiment of the present invention with the right half portion showing a weld clamp leveler in an up position and the left half portion showing the weld clamp leveler in a down position.
Figure 5:
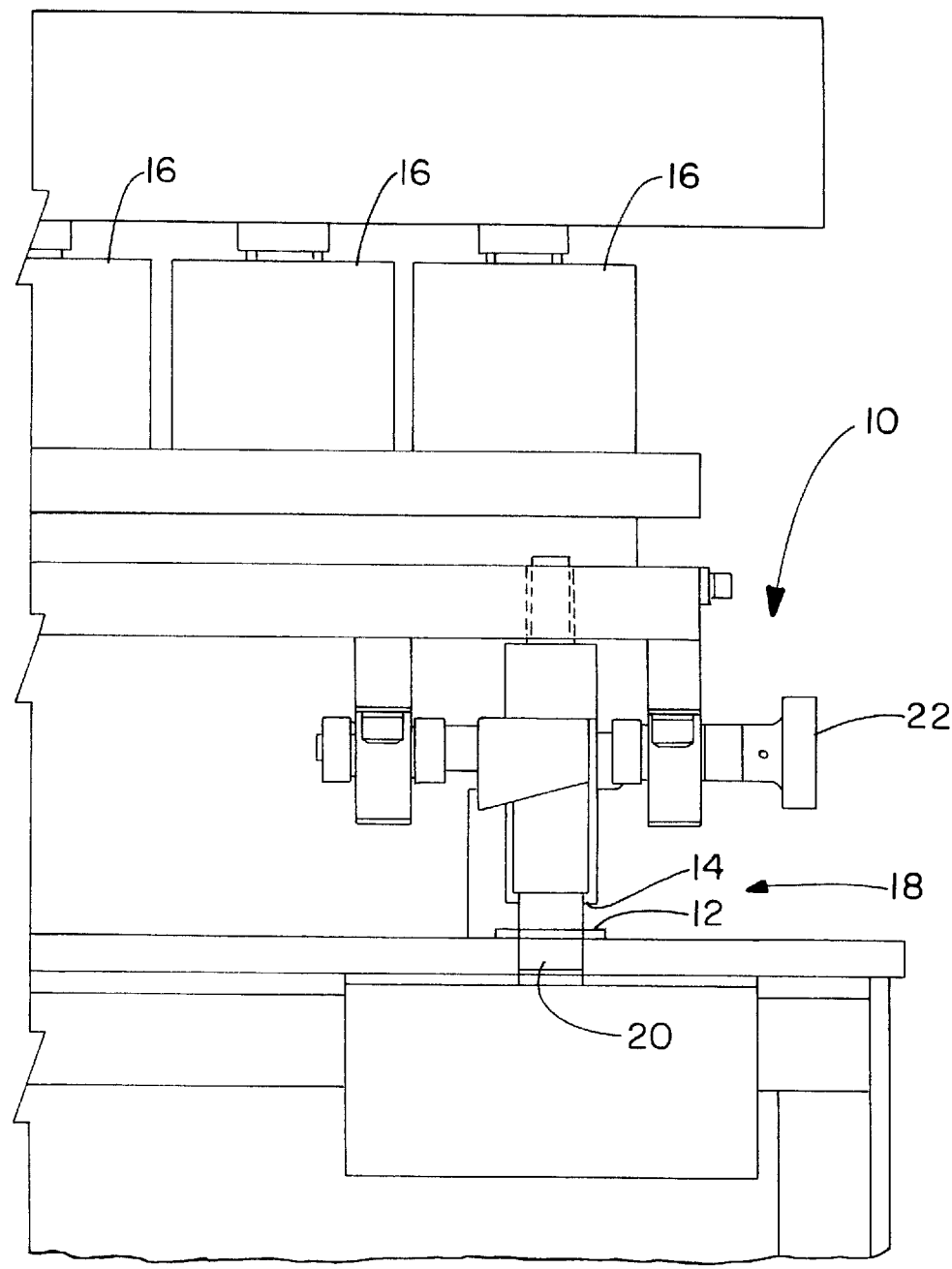
FIG. 5 is a side elevational view of the apparatus for leveling the clamping surface to obtain proper heat sink for narrow strips in a coil end joiner in accordance with the preferred embodiment of the present invention shown in FIG. 4 with the weld clamp leveler in its up position.

In the following detailed description of a preferred embodiment of the present invention, reference is made to the accompanying drawings which, in conjunction with this detailed description, illustrate and describe a preferred embodiment of an apparatus for leveling the clamping surface to obtain proper heat sink for narrow strips in a coil end joiner, generally identified by reference number 10, in accordance with the present invention. Referring to FIGS. 4 and 5, which show a front elevational view of an apparatus for leveling the clamping surface to obtain proper heat sink for narrow strips in a coil end joiner in accordance with a preferred embodiment of the present invention with the right half portion showing a weld clamp leveler in an up position and the left half portion showing the weld clamp leveler in a down position and a side elevational view of the apparatus for leveling the clamping surface to obtain proper heat sink for narrow strips in a coil end joiner in accordance with the preferred embodiment of the present invention shown in FIG. 4 with the weld clamp leveler in its up position, respectively, apparatus for leveling the clamping surface to obtain proper heat sink for narrow strips in a coil end joiner 10 is used in conjunction with coil end joiners of conventional design and includes coil material support table 12 and retaining plate 14. In addition, apparatus for leveling the clamping surface to obtain proper heat sink for narrow strips in a coil end joiner 10 includes one or more force actuators 16 to provide vertical movement of retaining plate 14 and position retaining plate 14 against coil material to be joined. Force actuators 16 can be, for example, manually, pneumatically or hydraulically actuated and, most preferably, include six (6) air cylinders which are preferably positioned at the left front, left central, left rear, right front, right central and right rear portion of retaining plate 14 in relation to coil material support table 12. Use of multiple force actuators 16 permits retaining plate 14 to pivot or "tilt" in relation to coil material support table 12 and the coil material to be joined.

Accordingly, apparatus for leveling the clamping surface to obtain proper heat sink for narrow strips in a coil end joiner 10 further includes weld clamp leveler 18 which is capable of maintaining retaining plate 14 relatively level with coil material support table 12 and the coil material to be joined, particularly if the coil material being joined is relatively narrow such that it would normally cause retaining plate 14 to tilt in relation to coil material support table 12 and the coil material to be joined. Weld clamp leveler 18 preferably includes one or more adjustable offset members 20, most preferably two (2) adjustable pins, which allow weld clamp leveler 18 to be positioned at substantially the same offset between coil material support table 12 and retaining plate 14 as the thickness of the coil material being joined. However, one or more adjustable offset members 20 could, alternatively, consist of one or more plate(s), peg(s) or other structural member(s) to provide substantially the same offset between coil material support table 12 and retaining plate 14 as the thickness of the coil material being joined. The offset between coil material support table 12 and retaining plate 14 is preferably adjusted by turning adjustable turn knob 22 which moves adjustable offset members 20 upwardly or downwardly as desired.

The sequence for operating apparatus for leveling the clamping surface to obtain proper heat sink for narrow strips in a coil end joiner 10 will now be described. First, an operator retracts adjustable offset members 20 below coil material support table 12 by rotating adjustable turn knob 22 in one rotational direction, most preferably counterclockwise, until it stops. A first piece of the coil material to be joined is then placed on a rear portion of coil material support table 12 behind adjustable offset members 20, and most preferably against a coil material edge guide, and a second piece of the coil material to be joined is placed on a forward portion of coil material support table 12 in front of adjustable offset members 20. The operator then brings retaining plate 14 down to its closed position and places weld clamp leveler selector switch 24 to its "on" or up position. Adjustable turn knob 22 is then rotated in a second rotational direction, most preferably clockwise, until adjustable offset members 20 contact retaining plate 14. At this time, adjustable offset members 20 are properly positioned for the coil material to be joined and the first and second pieces of the coil material to be joined are removed by the operator from coil material support table 12. If another thickness of coil material is to be joined, the above sequence of steps are repeated for the new thickness of coil material. On the other hand, if the width of the coil material to be joined is sufficiently wide such that weld clamp leveler 18 is not needed to preclude tilting of retaining plate 14, weld clamp leveler selector switch 24 is turned to its "off" or downward position and weld clamp leveler 18 is disengaged and adjustable offset members 20 maintain their settings for the last coil material thickness for which they were adjusted.

Although the present invention has been described above in detail, the same is by way of illustration and example only and is not to be taken as a limitation on the present invention. For example, further features and advantages of apparatus for leveling the clamping surface to obtain proper heat sink for narrow strips in a coil end joiner 10 are shown in the photographs enclosed as an appendix to the present patent application. Accordingly, the scope and content of the present invention are to be defined only by the terms of the appended claims.

What is claimed is:

1. An apparatus for leveling the clamping surface to obtain proper heat sink for narrow strips in a coil end joiner, comprising:

a coil material support table for supporting coil material to be joined thereon;

a retaining plate positioned above said coil material support table, said retaining plate being movable in a substantially vertical direction to retain the coil material to be joined between said coil material support table and said retaining plate; and a weld clamp leveler movable in a substantially vertical direction which provides a predetermined offset between said coil material support table and said retaining plate to preclude tilting of said retaining plate in relation to said coil material support table and the coil material to be joined.

2. The apparatus for leveling the clamping surface to obtain proper heat sink for narrow strips in a coil end joiner in accordance with claim 1, wherein said weld clamp leveler includes at least adjustable offset member which provides a predetermined offset between said coil material support table and said retaining plate and precludes tilting of said retaining plate in relation to said coil material support table and the coil material to be joined.

3. The apparatus for leveling the clamping surface to obtain proper heat sink for narrow strips in a coil end joiner in accordance with claim 2, wherein said at least one adjustable offset member extends upwardly from below said coil material support table.

4. The apparatus for leveling the clamping surface to obtain proper heat sink for narrow strips in a coil end joiner in accordance with claim 3, wherein said at least one adjustable offset member is adjustable upwardly and downwardly by an adjustable turn knob.

5. The apparatus for leveling the clamping surface to obtain proper heat sink for narrow strips in a coil end joiner in accordance with claim 4, wherein said coil material support table includes a forward portion and a rearward portion and said at least one adjustable offset member is positioned in said forward portion of said coil material support table.

6. The apparatus for leveling the clamping surface to obtain proper heat sink for narrow strips in a coil end joiner in accordance with claim 5, wherein said weld clamp leveler is capable of being disengaged.

7. The apparatus for leveling the clamping surface to obtain proper heat sink for narrow strips in a coil end joiner in accordance with claim 6, wherein the last settings of said at least one adjustable offset member are maintained when said weld clamp leveler is disengaged.

8. The apparatus for leveling the clamping surface to obtain proper heat sink for narrow strips in a coil end joiner in accordance with claim 7, wherein said retaining plate is moved substantially vertically by at least one force actuator.

9. The apparatus for leveling the clamping surface to obtain proper heat sink for narrow strips in a coil end joiner in accordance with claim 7, wherein said retaining plate is moved substantially vertically by six (6) air cylinders, one positioned at a right front portion of said retaining plate, one positioned at a right central portion of said retaining plate, one positioned at a right rear portion of said retaining plate, one positioned at a left front portion of said retaining plate, one positioned at a left central portion of said retaining plate and one positioned at a left rear portion of said retaining plate.

10. The apparatus for leveling the clamping surface to obtain proper heat sink for narrow strips in a coil end joiner in accordance with claim 1, where said weld clamp leveler includes at least one adjustable pin which provides a predetermined offset between said coil material support table and said retaining plate and precludes tilting of said retaining plate in relation to said coil material support table and the coil material to be joined.

11. The apparatus for leveling the clamping surface to obtain proper heat sink for narrow strips in a coil end joiner in accordance with claim 10, wherein said at least one adjustable pin extends upwardly from below said coil material support table.

12. The apparatus for leveling the clamping surface to obtain proper heat sink for narrow strips in a coil end joiner in accordance with claim 11, wherein said at least one adjustable pin is adjustable upwardly and downwardly by an adjustable turn knob.

13. The apparatus for leveling the clamping surface to obtain proper heat sink for narrow strips in a coil end joiner in accordance with claim 1, wherein said coil material support table includes a forward portion and a rearward portion and said at least one weld clamp leveler is positioned in said forward portion of said coil material support table.

14. The apparatus for leveling the clamping surface to obtain proper heat sink for narrow strips in a coil end joiner in accordance with claim 1, wherein said weld clamp leveler is capable of being disengaged.

15. The apparatus for leveling the clamping surface to obtain proper heat sink for narrow strips in a coil end joiner in accordance with claim 14, wherein the last settings of said weld clamp leveler are maintained when said weld clamp leveler is disengaged.

16. The apparatus for leveling the clamping surface to obtain proper heat sink for narrow strips in a coil end joiner in accordance with claim 1, wherein said retaining plate is moved substantially vertically by at least one force actuator.

17. The apparatus for leveling the clamping surface to obtain proper heat sink for narrow strips in a coil end joiner in accordance with claim 1, wherein said retaining plate is moved substantially vertically by six (6) air cylinders, one positioned at a right front portion of said retaining plate, one positioned at a right central portion of said retaining plate, one positioned at a right rear portion of said retaining plate, one positioned at a left front portion of said retaining plate, one positioned at a left central portion of said retaining plate and one positioned at a left rear portion of said retaining plate.

\* \* \* \* \*